United States Patent
Liu et al.

(10) Patent No.: US 9,428,640 B2
(45) Date of Patent: *Aug. 30, 2016

(54) POLYMERS AND FLAME RETARDANT MATERIALS

(71) Applicant: Industrial Technology Research Institute, Hsinchu (TW)

(72) Inventors: Lung-Chang Liu, New Taipei (TW); Po-Jen Yang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 201 days.

This patent is subject to a terminal disclaimer.

(21) Appl. No.: 14/144,208

(22) Filed: Dec. 30, 2013

(65) Prior Publication Data

US 2014/0121323 A1 May 1, 2014

Related U.S. Application Data

(63) Continuation of application No. 13/661,327, filed on Oct. 26, 2012, now Pat. No. 8,722,823.

(30) Foreign Application Priority Data

May 8, 2013 (TW) .............................. 101116310 A

(51) Int. Cl.
| | |
|---|---|
| *C08F 30/02* | (2006.01) |
| *C08F 26/06* | (2006.01) |
| *C08L 43/02* | (2006.01) |
| *C08F 212/32* | (2006.01) |
| *C08L 23/12* | (2006.01) |
| *C08L 53/02* | (2006.01) |
| *C08F 12/22* | (2006.01) |

(Continued)

(52) U.S. Cl.
CPC ............... *C08L 43/02* (2013.01); *C08F 12/22* (2013.01); *C08F 12/26* (2013.01); *C08F 26/06* (2013.01); *C08F 30/02* (2013.01); *C08F 212/32* (2013.01); *C08L 9/06* (2013.01); *C08L 23/12* (2013.01); *C08L 39/04* (2013.01); *C08L 53/02* (2013.01); *C08L 63/00* (2013.01); *C08F 12/28* (2013.01); *C08F 130/02* (2013.01); *C08F 226/06* (2013.01); *C08F 230/02* (2013.01); *C08L 77/00* (2013.01)

(58) Field of Classification Search
CPC ........ C08F 26/06; C08F 30/02; C08F 12/26; C08F 12/28; C08F 126/06; C08F 130/02; C08F 226/06; C08F 230/02; C08F 212/32; C08L 43/02; C08L 39/04
See application file for complete search history.

(56) References Cited

U.S. PATENT DOCUMENTS

| 2,920,061 A | 1/1960 | Schaefer |
| 5,639,799 A | 6/1997 | Books et al. |

(Continued)

FOREIGN PATENT DOCUMENTS

| CN | 101939375 | 1/2011 |
| JP | 53101894 | 9/1978 |

(Continued)

OTHER PUBLICATIONS

Bob A. Howell et al., "Development of Additives possessing both solid-phase and gas-phase flame retardant activities", Polymer Degradation and Stability 93(2008), pp. 2052-2057.

(Continued)

*Primary Examiner* — Ling Choi
*Assistant Examiner* — David L Miller
(74) *Attorney, Agent, or Firm* — Muncy, Geissler, Olds & Lowe, P.C.

(57) ABSTRACT

Disclosed is a polymer including a polymer polymerized of a phosphorous-based monomer, a polymer polymerized of a nitrogen-based monomer, or a polymer polymerized of the phosphorous-based monomer and the nitrogen-based monomer. The phosphorous-based monomer has the formula as follows:

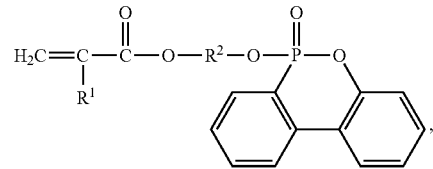

and the nitrogen-based monomer has the formula as follows:

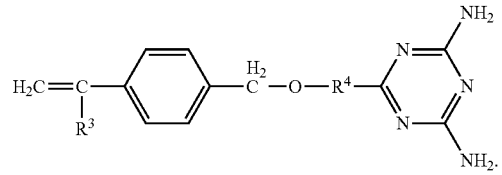

$R^1$ and $R^3$ consists of hydrogen, a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, respectively. $R^2$ and $R^4$ consists of a phenylene group, a $C_{7-12}$ alkyl phenylene group, a $C_{1-12}$ alkylene group, a $C_{2-12}$ ether group, a $C_{1-12}$ alkylene glycol group, or a $C_{1-12}$ hydroxylalkylene group, respectively.

8 Claims, No Drawings

(51) Int. Cl.
*C08F 12/26* (2006.01)
*C08L 9/06* (2006.01)
*C08L 39/04* (2006.01)
*C08L 63/00* (2006.01)
*C08F 226/06* (2006.01)
*C08F 130/02* (2006.01)
*C08F 230/02* (2006.01)
*C08F 12/28* (2006.01)
*C08L 77/00* (2006.01)

(56) References Cited

U.S. PATENT DOCUMENTS

| | | | |
|---|---|---|---|
| 7,132,502 B2 | 11/2006 | Depuydt et al. | |
| 7,323,504 B2 | 1/2008 | Steenbakkers-Menting et al. | |
| 7,550,548 B2 | 6/2009 | Hatanaka et al. | |
| 7,645,825 B2 | 1/2010 | Seki | |
| 8,722,823 B2 * | 5/2014 | Liu | C08F 26/06 526/261 |
| 2004/0026671 A1 | 2/2004 | Van Den Bergen et al. | |
| 2008/0182086 A1 * | 7/2008 | Satou | C07F 9/6571 72 428/195.1 |
| 2010/0181696 A1 | 7/2010 | Glauner et al. | |

FOREIGN PATENT DOCUMENTS

| | | |
|---|---|---|
| JP | 11345525 | 12/1999 |
| JP | 2000047467 | 2/2000 |
| JP | 2001207053 | 7/2001 |
| JP | 2002083574 | 3/2002 |
| JP | 2004238608 | 8/2004 |
| JP | 2004263188 | 9/2004 |
| JP | 2005159337 | 6/2005 |
| JP | 2006116796 | 5/2006 |
| JP | 2008151980 | 7/2008 |
| JP | 2009019184 | 1/2009 |
| JP | 2009-256622 A | 11/2009 |
| TW | I227263 | 2/2005 |
| TW | 200833796 | 8/2008 |
| TW | 200844160 | 11/2008 |

OTHER PUBLICATIONS

Lijuan Chen et al., "A new intumescent flame retardant containing phosphorus and nitrogen: Preparation, thermal properties and application to UV curable coating", Progress in Organic Coatings 70 (2011), pp. 59-66.

Congtranh Nguyen et al., "Thermal stabilities and flame retardancies of nitrogen-phosphorus flame retardants based on bisphosphoramidates", Polymer Degradation and Stability 93(2008) 1037-1043.

Shui-Yu Lu et al., "Recent developments in the chemistry of halogen-free flame retardant polymers", Prog. Polym. Sci. 27(2002) pp. 1661-1712.

* cited by examiner

POLYMERS AND FLAME RETARDANT MATERIALS

CROSS-REFERENCE TO RELATED APPLICATIONS

This application is a Continuation of pending U.S. patent application Ser. No. 13/661,327, filed on Oct. 26, 2012 and entitled "Polymers, polymer blends, and flame retardant materials", which claims priority from, Taiwan Application Serial Number 101116310, filed on May 8, 2012, the disclosure of which is hereby incorporated by reference herein in its entirety.

TECHNICAL FIELD

The technical field relates to polymers, polymer blends, and flame retardant materials.

BACKGROUND

A flame retarder is an agent added to a flammable material (e.g. plastic, rubber, cellulose, paper, wood, and the likes) to make it non-flammable or no flame expandable. In recent decades, flame retarders have been applied in various fields such as the chemical industry or in various products such as electronic products. In general, flame retarders contain halogen. However, global areas, such as the Europe Union on Jul. 1, 2006, have declared restrictions on the use of certain hazardous substances in electrical and electronic equipment; so-called RoHS, wherein the halogenated flame retarder cannot be applied to 3C products (e.g. substrate or plastic housing in computers, televisions, and the likes). Accordingly, a competitive non-halogen flame retarder which is highly efficient, meeting the restrictions such as no halogen, is called-for.

SUMMARY

One embodiment of the disclosure provides a polymer, polymerized of a nitrogen-based monomer, a phosphorous-based monomer, or combinations thereof, wherein the phosphorous-based monomer has the formula:

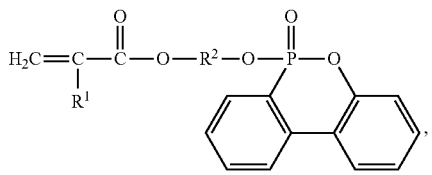

wherein $R^1$ consists of consists of hydrogen, a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, and $R^2$ consists of a phenylene group, a $C_{7-12}$ alkyl phenylene group, a $C_{1-12}$ alkylene group, a $C_{2-12}$ ether group, a $C_{1-12}$ alkylene glycol group, or a $C_{1-12}$ hydroxylalkylene group, and wherein the nitrogen-based monomer has the formula:

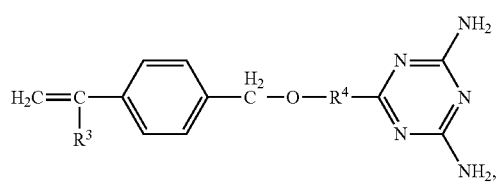

wherein $R^3$ consists of hydrogen, a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, and $R^4$ consists of a phenylene group, a $C_{7-12}$ alkyl phenylene group, a $C_{1-12}$ alkylene group, a $C_{2-12}$ ether group, a $C_{1-12}$ alkylene glycol group, or a $C_{1-12}$ hydroxylalkylene group.

One embodiment of the disclosure provides a blend, comprising at least two of a polymer polymerized of a phosphorous-based monomer, a polymer polymerized of a nitrogen-based monomer, and a polymer polymerized of the nitrogen-based monomer and the phosphorous-based monomer, wherein the phosphorous-based monomer has the formula:

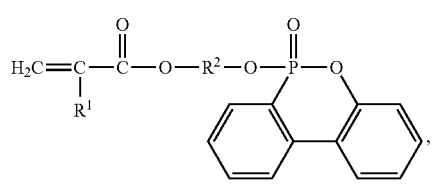

wherein $R^1$ consists of consists of hydrogen, a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, and $R^2$ consists of a phenylene group, a $C_{7-12}$ alkyl phenylene group, a $C_{1-12}$ alkylene group, a $C_{2-12}$ ether group, a $C_{1-12}$ alkylene glycol group, or a $C_{1-12}$ hydroxylalkylene group, and wherein the nitrogen-based monomer has the formula:

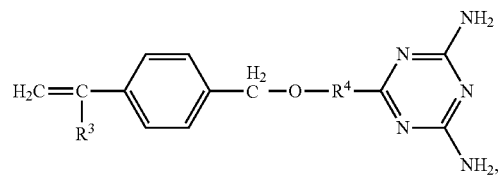

wherein $R^3$ consists of hydrogen, a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, and $R^4$ consists of a phenylene group, a $C_{7-12}$ alkyl phenylene group, a $C_{1-12}$ alkylene group, a $C_{2-12}$ ether group, a $C_{1-12}$ alkylene glycol group, or a $C_{1-12}$ hydroxylalkylene group.

One embodiment of the disclosure provides a flame retardant material, comprising: a polymer polymerized of a phosphorous-based monomer, a polymer polymerized of a nitrogen-based monomer, a polymer polymerized of the phosphorous-based monomer and the nitrogen-based monomer, or a blend comprising at least two polymers thereof; and a thermoset resin, wherein the phosphorous-based monomer has the formula:

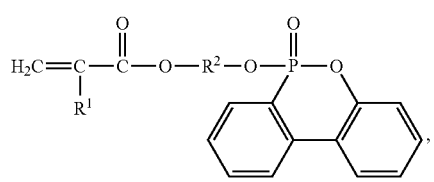

wherein $R^1$ consists of hydrogen, a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, and $R^2$ consists of a phenylene group, a $C_{7-12}$ alkyl phenylene group, a $C_{1-12}$ alkylene group, a $C_{2-12}$ ether group, a $C_{1-12}$ alkylene glycol group, or a $C_{1-12}$ hydroxylalkylene group, and wherein the nitrogen-based monomer has the formula:

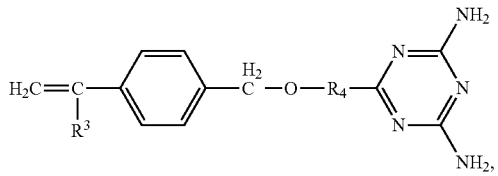

wherein $R^3$ consists of hydrogen, a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, and $R^4$ consists of a phenylene group, a $C_{7-12}$ alkyl phenylene group, a $C_{1-12}$ alkylene group, a $C_{2-12}$ ether group, a $C_{1-12}$ alkylene glycol group, or a $C_{1-12}$ hydroxylalkylene group, and wherein the non-halogen flame retarder and the thermoset resin have a weight ratio of 1:1 to 1:200.

One embodiment of the disclosure provides a flame retardant material, comprising: a polymer polymerized of a phosphorous-based monomer, a polymer polymerized of a nitrogen-based monomer, a polymer polymerized of the phosphorous-based monomer and the nitrogen-based monomer, or a blend comprising at least two polymers thereof; and a thermoplastic resin, wherein the phosphorous-based monomer has the formula:

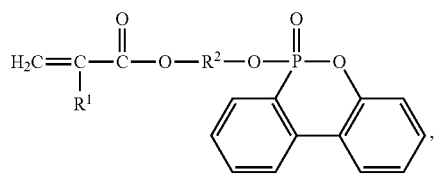

wherein $R^1$ consists of consists of hydrogen, a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, and $R^2$ consists of a phenylene group, a $C_{7-12}$ alkyl phenylene group, a $C_{1-12}$ alkylene group, a $C_{2-12}$ ether group, a $C_{1-12}$ alkylene glycol group, or a $C_{1-12}$ hydroxylalkylene group, and wherein the nitrogen-based monomer has the formula:

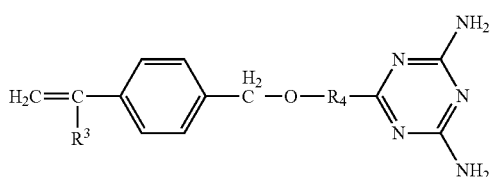

wherein $R^3$ consists of a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, and $R^4$ consists of a phenylene group, a $C_{7-12}$ alkyl phenylene group, a $C_{1-12}$ alkylene group, a $C_{2-12}$ ether group, a $C_{1-12}$ alkylene glycol group, or a $C_{1-12}$ hydroxylalkylene group, and wherein the non-halogen flame retarder and the thermoplastic resin have a weight ratio of 1:1 to 1:200.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

In one embodiment, the phosphorus-based monomer in Formula 1 is polymerized to form a polymer which serves as a non-halogen flame retarder.

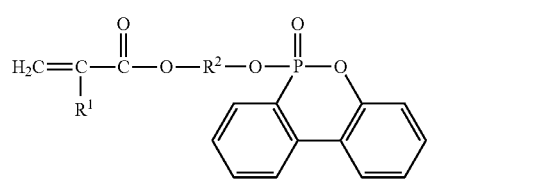

(Formula 1)

In Formula 1, $R^1$ consists of consists of hydrogen, a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, and $R^2$ consists of a phenylene group, a $C_{7-12}$ alkyl phenylene group, a $C_{1-12}$ alkylene group, a $C_{2-12}$ ether group, a $C_{1-12}$ alkylene glycol group, or a $C_{1-12}$ hydroxylalkylene group.

In one embodiment, a nitrogen-based monomer in Formula 2 is polymerized to form a polymer which serves as a non-halogen flame retarder.

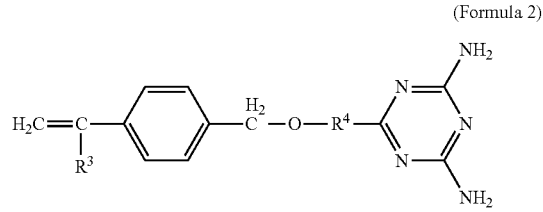

(Formula 2)

In Formula 2, $R^3$ consists of hydrogen, a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, and $R^4$ consists of a phenylene group, a $C_{7-12}$ alkyl phenylene group, a $C_{1-12}$ alkylene group, a $C_{2-12}$ ether group, a $C_{1-12}$ alkylene glycol group, or a $C_{1-12}$ hydroxylalkylene group.

In one embodiment, the nitrogen-based monomer and the phosphorous-based monomer are copolymerized to form a polymer which serves as a non-halogen flame retarder. In certain embodiments, the nitrogen-based monomer and the phosphorous-based monomer have a molar ratio of about 1:1 to 1:10. If the polymer polymerized of the nitrogen-based monomer and the phosphorous-based monomer has an overly low molar ratio of the nitrogen-based monomer, its flame retardant effect will be similar to the polymer polymerized of the phosphorous-based polymer. If the polymer polymerized of the nitrogen-based monomer and the phosphorous-based monomer has an overly low molar ratio of the phosphorous-based monomer, its flame retardant effect will be similar to the polymer polymerized of the nitrogen-based polymer.

In one embodiment, the polymer polymerized of the nitrogen-based monomer and the polymer polymerized of the phosphorous-based monomer are blended to serve as a non-halogen flame retarder, wherein the polymer polymerized of the nitrogen-based monomer and the polymer polymerized of the phosphorous-based monomer have a weight ratio of about 1:1 to 1:5.

In one embodiment, at least two of the polymer polymerized of the nitrogen-based monomer, the polymer polymerized of the phosphorous-based monomer, and the polymer polymerized of the nitrogen-based monomer and the phosphorous-based monomer are blended to serve as a non-halogen flame retarder.

The polymer has a weight-average molecular weight of about 1,000 to 1,000,000, or of about 5,000 to 15,000. An overly high weight-average molecular weight of the polymer will make the polymer lack processibility. An overly low weight-average molecular weight of the polymer will make the polymer lack flame retardant and thermal resistance capabilities.

In one embodiment, the phosphorous-based monomer has the structure as shown in Formula 3:

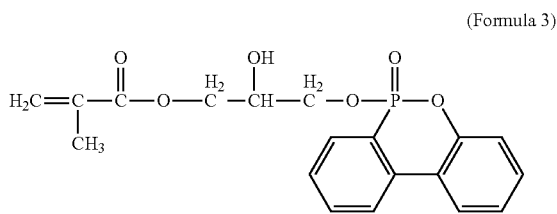 [SMILES: C=C(C)C(=O)OCC(O)COP1(=O)Oc2ccccc2-c2ccccc21]

(Formula 3)

In one embodiment, the nitrogen-based monomer has the structure as shown in Formula 4:

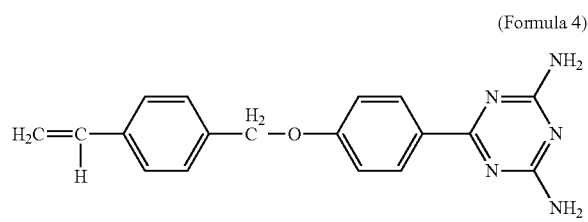 [SMILES: C=Cc1ccc(COc2ccc(-c3nc(N)nc(N)n3)cc2)cc1]

(Formula 4)

The non-halogen flame retarder can be further blended with a thermoplastic resin or a thermoset resin to form a flame retardant material. The thermoplastic resin can be polyamide, polyolefin (e.g. $C_{2-6}$ polyolefin), or styrene-ethylene-butadiene-styrene copolymer. The thermoset resin can be epoxy resin. When the flame retardant material includes the thermoset resin and the non-halogen flame retarder, the non-halogen flame retarder and the thermoset resin have a weight ratio of about 1:1 to 1:200 or of about 1:1 to 1:10. When the flame retardant material includes the thermoplastic resin and the non-halogen flame retarder, the non-halogen flame retarder and the thermoplastic resin have a weight ratio of about 1:1 to 1:200 or of about 1:1 to 1:10. An overly high ratio of the non-halogen flame retarder will make the flame retardant material have too much solid content to be processed. An overly low ratio of the non-halogen flame retarder will make the flame retardant material lack a flame retardant effect. Note that the non-halogen flame retarder and the thermoset resin (or thermoplastic resin) are blended without any crosslink or covalent bonding therebetween.

In one embodiment, the flame retardant material may further contain other additives such as a processing aid, a pigment, other commercially available flame retarders, or other common additives.

Below, exemplary embodiments will be described in detail so as to be easily realized by a person having ordinary knowledge in the art. The inventive concept may be embodied in various forms without being limited to the exemplary embodiments set forth herein.

EXAMPLES

Synthesis Example 1

100.0 g of 9,10-Dihydro-9-oxa-10-phosphaphenanthrene-10-oxide (DOPO, 0.46 mole, commercially available from Aldrich) was put into a round bottle (2 L). 600 mL of ethanol was added into the round bottle and then stirred to dissolve the DOPO. 300 mL of hydrogen peroxide was added into the round bottle, and the solution in the round bottle was refluxed for 12 hours. The reaction was followed by thin layer chromatography (TLC) to check whether the reaction was completed or not. The completed reaction was cooled to room temperature, vacuumed by a rotatory pump to remove solvents thereof, and then re-crystallized by isopropanol and water (v/v=3/1). Crystal was collected by filtering, and then dried in a vacuum oven to obtain a white solid (yield=95%). The reaction is shown in Formula 5, and the spectra data of the product in Formula 5 is as follows. $^1$H NMR (400 MHz, DMSO-$d_6$, ppm): 4.41 (s, 1H), 7.23-7.31 (m, 2H), 7.41-7.56 (m, 2H), 7.72-7.83 (m, 2H), 8.11-8.15 (m, 2H).

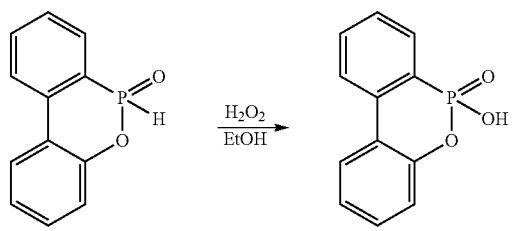

(Formula 5)

50.0 g of the product in Formula 5 (0.22 mole) was put into a two-necked bottle (500 mL). 300 mL of anhydrous tetrahydrofuran (THF) was added into the two-necked bottle under nitrogen, and stirred to dissolve the product in Formula 5. 39.8 g of glycidyl methacrylate (0.28 mole, commercially available from Aldrich) was added into the solution and averagely stirred, 0.87 g of a liquid catalyst N,N-dimethyl benzyl amine (6.5 mmole) was then injected into the solution, and the solution was heated to 70° C. to react at 70° C. for 1 day. The reaction was followed by TLC to check whether the reaction was completed or not. The completed reaction was cooled to room temperature, vacuumed by a rotatory pump to remove solvents thereof, washed by n-hexane, and dried by a vacuum pump to obtain a translucent viscous liquid (yield=85%). The reaction is shown in Formula 6, and the spectra data of the product in Formula 6 is as follows. $^1$H NMR (400 MHz, CDCl$_3$, ppm):

1.90 (s, 3H), 1.96 (s, 1H), 3.45-3.50 (m, 2H), 4.10-4.19 (m, 3H), 5.55 (s, 1H), 6.07 (s, 1H), 7.23-7.30 (m, 2H), 7.40-7.53 (m, 2H), 7.74-8.00 (m, 4H).

(Formula 6)

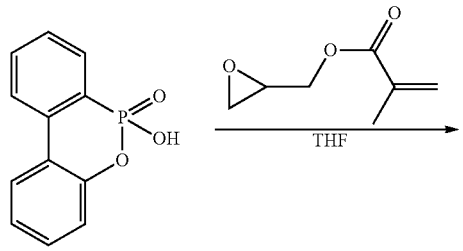

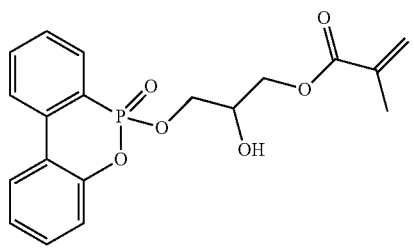

50.0 g of the product in Formula 6 (0.13 mole) and 1.2 g of a catalyst 2,2'-dicyano-2,2'-diazopropane (AIBN, 6.7 mmole) were put into a round bottle (1 L). 500 mL of anhydrous tetrahydrofuran (THF) was added into the round bottle under nitrogen, and stirred to dissolve the product in Formula 6 and the catalyst. The solution was heated to 65° C. to react at 65° C. for 1 day. The reaction was then cooled to room temperature, and then poured into ether for precipitating a large amount of a white solid. The ether suspension was filtered to obtain a filtered cake. The filtered cake was dried in a vacuum oven to obtain a white solid (yield=80%). The reaction is shown in Formula 7, and the product in Formula 7 had the weight-average molecular weight of 8,600. The spectra data of the product in Formula 7 is as follows. $^1$H NMR (400 MHz, DMSO-$d_6$, ppm): 0.67 (br, 5H), 3.80-3.97 (br, m, 4H), 5.28-5.40 (br, m, 1H), 7.21-7.34 (br, m, 3H), 7.49 (br, 1H), 7.69 (br, 1H), 7.85 (br, 1H), 8.19 (br, 2H).

(Formula 7)

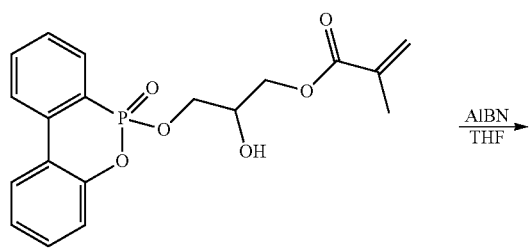

-continued

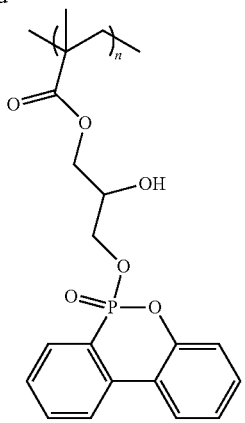

Synthesis Example 2

50.0 g of 4-hydroxybenzonitrile (0.42 mole, commercially available from Aldrich), 116.0 g of potassium carbonate (0.84 mole), and 5.0 g of potassium iodide (30 mmole) were put into a round bottle (1 L). 600 mL of acetone was added into the round bottle and stirred to dissolve the starting materials. 78.3 g of 4-(chloromethyl)styrene (0.51 mole, commercially available from Aldrich) was slowly and dropwise added to the solution, and the solution was heated to reflux for 48 hours. The reaction was followed by TLC to check whether the reaction was completed or not. The completed reaction was cooled to room temperature and filtered, and the filtered cake was washed to collect the filtrate. The filtrate was vacuumed by a rotatory pump to remove solvents thereof, and re-crystallized by n-hexane. Crystal was collected by filtering, and then dried in a vacuum oven to obtain a white solid (yield=93%). The reaction is shown in Formula 8, and the spectra data of the product in Formula 8 is as follows. $^1$H NMR (400 MHz, CDCl$_3$, ppm): 5.10 (s, 2H), 5.28 (d, J=14.5 Hz, 1H), 5.77 (d, J=23.4 Hz, 1H), 6.73 (dd, J$_1$=14.5 Hz, J$_2$=23.4 Hz, 3H), 7.02 (d, J=9.1 Hz, 2H), 7.37 (d, J=10.9 Hz, 2H), 7.44 (d, J=10.9 Hz, 2H), 7.59 (d, J=9.1 Hz, 2H).

(Formula 8)

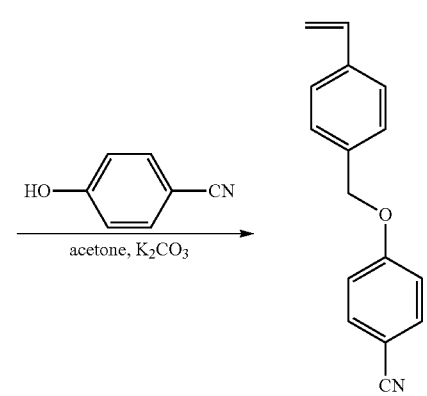

40.0 g of the product in Formula 8 (0.17 mole) and 38.1 g of potassium hydroxide (0.68 mole) were put into a round bottle (500 mL). 160 mL of 2-methoxy-ethanol was added into the round bottle and stirred to dissolve the starting materials. 78.3 g of dicyandiamide (0.51 mole) was slowly added into the solution, and the solution was heated to 90° C. to react at 90° C. for 8 hours. The reaction was followed by TLC to check whether the reaction was completed or not. The completed reaction was cooled to room temperature, and then poured into ice water for precipitating a large amount of a white solid. The white solid was collected by filtering and washed by water, and then re-crystallized by isopropanol and water (v/v=5/1). Crystal was collected by filtering, and then dried in a vacuum oven to obtain a white solid (yield=88%). The reaction is shown in Formula 9, and the spectra data of the product in Formula 9 is as follows. $^1$H NMR (400 MHz, DMSO-$d_6$, ppm): 5.14 (s, 2H), 5.26 (d, J=10.9 Hz, 1H), 5.84 (d, J=17.7 Hz, 1H), 6.66 (s, 4H), 6.73 (dd, $J_1$=10.9 Hz, $J_2$=17.7 Hz, 1H), 7.07 (d, J=8.8 Hz, 2H), 7.43 (d, J=8.1 Hz, 2H), 7.49 (d, J=8.1 Hz, 2H), 8.19 (d, J=8.8 Hz, 2H).

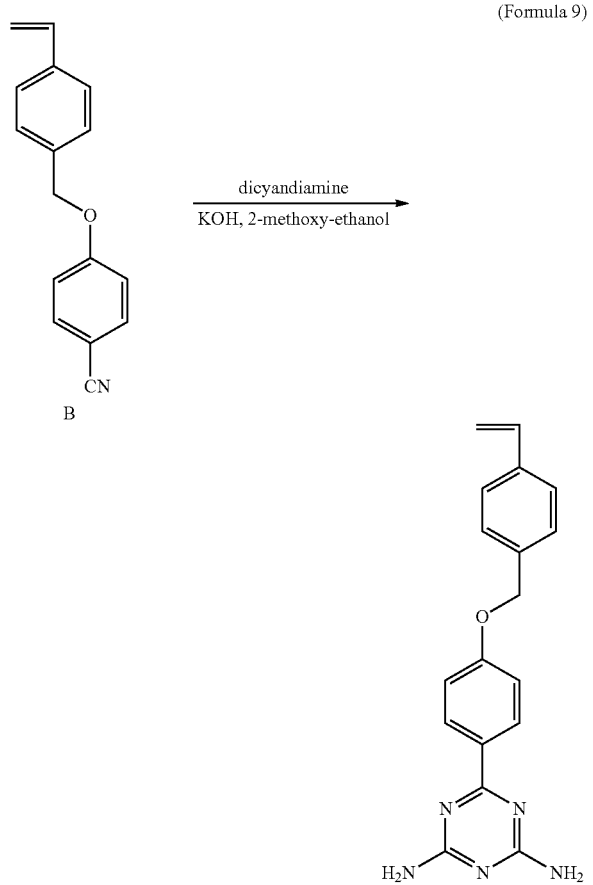

(Formula 9)

50.0 g of the product in Formula 9 (0.15 mole) and 1.3 g of a catalyst AIBN (7.6 mmole) were put into a round bottle (1 L). 500 mL of anhydrous dimethyl formamide (DMF) was added into the round bottle under nitrogen, and stirred to dissolve the product in Formula 9 and the catalyst. The solution was heated to 65° C. to react at 65° C. for 1 day. The reaction was then cooled to room temperature, and then poured into methanol for precipitating a large amount of a white solid. The methanol suspension was filtered to obtain a filtered cake. The filtered cake was dried in a vacuum oven to obtain a white solid (yield=75%). The reaction is shown in Formula 10, and the product in Formula 10 had the weight-average molecular weight of 11,500. The spectra data of the product in Formula 10 is as follows. $^1$H NMR (400 MHz, DMSO-$d_6$, ppm): 1.65 (br, 2H), 4.93 (br, 2H), 6.63 (br, 6H), 6.92 (br, m, 4H), 8.18 (br, 2H).

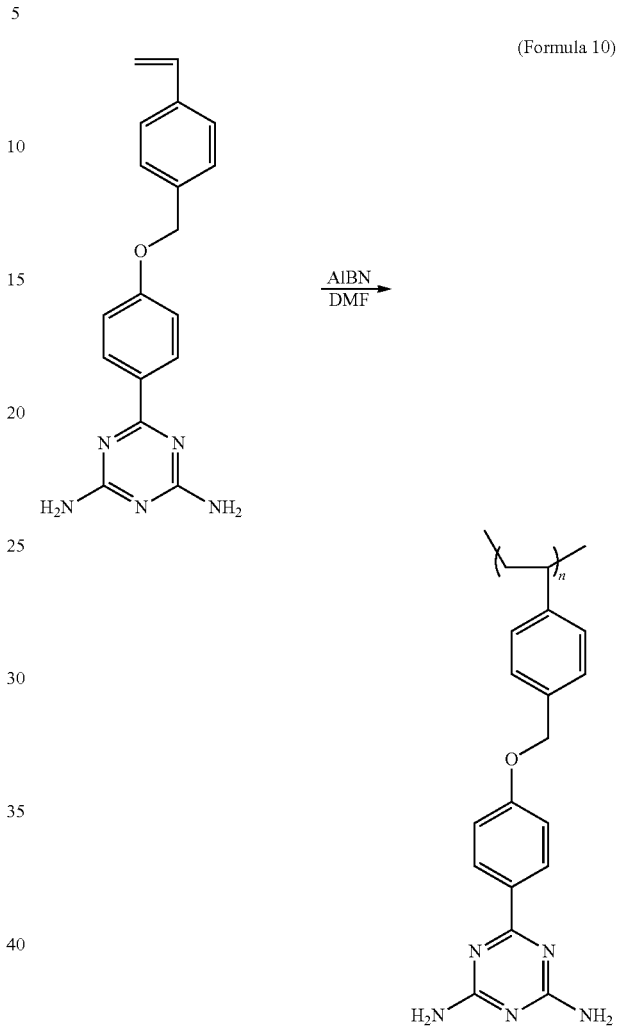

(Formula 10)

Synthesis Example 3

25 g of the compound in Formula 3 (66 mmole), 21.3 g of the compound in Formula 4 (66 mmole), and 1.1 g of AIBN (6.8 mmole) were put into a round bottle (1 L). 460 mL of anhydrous DMF was added into the round bottle under nitrogen, and stirred to dissolve the starting materials. The solution was heated to 65° C. to react at 65° C. for 1 day. The reaction was then cooled to room temperature, and then poured into methanol and ether (v/v=4/1) for precipitating a large amount of a white solid. The methanol/ether suspension was filtered to obtain a filtered cake. The filtered cake was dried in a vacuum oven to obtain a white solid (yield=60%). The reaction is shown in Formula 11, and the product in Formula 11 had the weight-average molecular weight of 12,500. The spectra data of the product in Formula 11 is as follows. $^1$H NMR (400 MHz, DMSO-$d_6$, ppm): 0.66-1.60 (br, m, 8H), 3.74-3.96 (br, m, 4H), 4.93-5.27 (br, m, 3H), 6.48-7.62 (br, m, 12H), 7.83-7.94 (br, m, 4H), 8.11-8.18 (br, 4H).

(Formula 11)

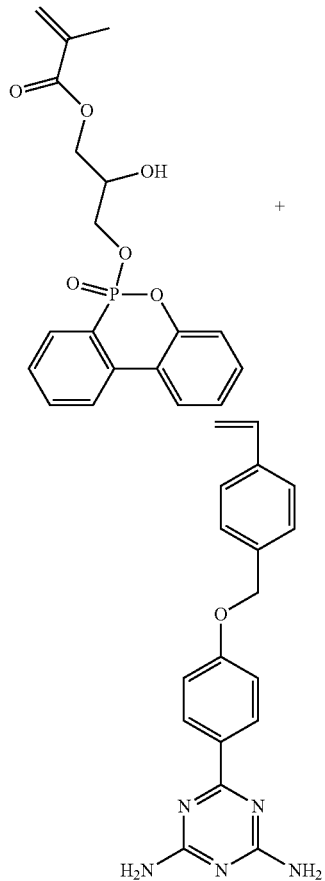

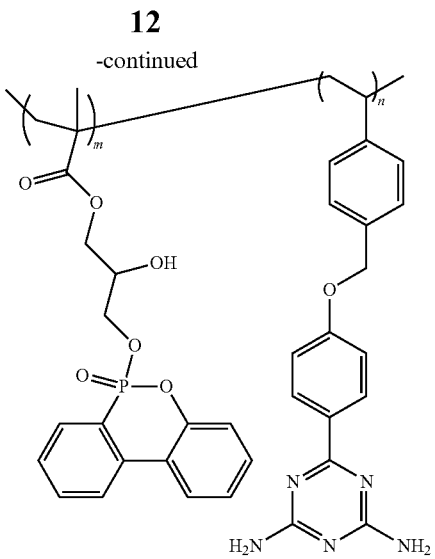

In Formula 11, m and n had a ratio of 1:1, and the product in Formula 11 was a random copolymer.

Example 1

50 parts by weight of polypropylene (PT100 commercially available from LCY Chemical Co.), 50 parts by weight of styrene-ethylene-butadiene-styrene (SEBS, 3151 commercially available from Formosa Chemical & Fiber Co.), different parts by weight of the product in Formula 7, different parts by weight of the product in Formula 10, different parts by weight of the product in Formula 11, different parts by weight of DOPO, different parts by weight of melamine, and different parts by weight of ammonium polyphosphate (APP-1 commercially available from Chembridge International Co.) were mixed, and then thermal pressed at 190° C. for 5 to 10 minutes to form samples of 12.5 cm×1.3 cm×0.3 cm. Compositions of the samples were tabulated and are shown in Table 1.

TABLE 1

| Batch | Polypropylene | SEBS | Product in Formula 7 | Product in Formula 10 | Product in Formula 11 | DOPO | Melamine | Ammonium Polyphosphate |
|---|---|---|---|---|---|---|---|---|
| a | 50 | 50 | 20 | 0 | 0 | 0 | 0 | 0 |
| b | 50 | 50 | 0 | 20 | 0 | 0 | 0 | 0 |
| c | 50 | 50 | 10 | 10 | 0 | 0 | 0 | 0 |
| d | 50 | 50 | 20 | 10 | 0 | 0 | 0 | 0 |
| e | 50 | 50 | 0 | 0 | 20 | 0 | 0 | 0 |
| f | 50 | 50 | 0 | 0 | 0 | 20 | 0 | 0 |
| g | 50 | 50 | 0 | 0 | 0 | 0 | 20 | 0 |
| h | 50 | 50 | 0 | 0 | 0 | 0 | 0 | 20 |

The properties of the samples, such as decomposition temperature ($T_d$, temperature corresponding to a weight loss of 5 wt %), char residue yield at 800° C., limited oxygen index (LOI), UL-94-V, sample appearance at 190° C., and sample appearance at 90° C. for 2 days were measured and tabulated and are shown in Table 2.

TABLE 2

| Batch | $T_d$ (°C.) | Char residue yield (%) | LOI | UL94-V* | Sample appearance at 190° C. | Sample appearance at 90° C. for 2 days |
|---|---|---|---|---|---|---|
| a | 258 | 9.1 | 21 | V1 | No blooming | No blooming |
| b | 343 | 1.6 | 19 | V2 | No blooming | No blooming |
| c | 275 | 6.3 | 20 | V1 | No blooming | No blooming |
| d | 268 | 7.7 | 22 | V0 | No blooming | No blooming |
| e | 290 | 15.6 | 23 | V0 | No blooming | No blooming |
| f | 220 | 8.8 | 20 | V1 | Blooming | Blooming |
| g | 276 | 0.8 | 19 | V2 | No blooming | No blooming |
| h | 288 | 26.6 | 23 | V0 | Blooming | Blooming |

In Table 1, the products in Synthesis 1 to 3 served as a flame retarder in the batches a to e, and the DOPO, the melamine, or the ammonium polyphosphate served as a flame retarder in the batches f to h. As shown in the comparison of Table 2, the samples with the flame retarder of the disclosure should not bloom at high temperatures, and all had a decomposition temperature ($T_d$) of over 250° C.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A polymer, polymerized of a nitrogen-based monomer, a phosphorous-based monomer, or combinations thereof, wherein the phosphorous-based monomer has the formula:

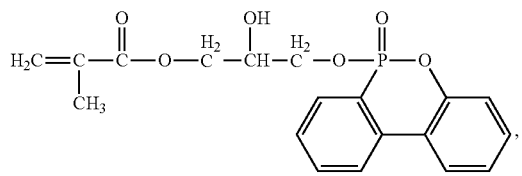 [SMILES: C=C(C)C(=O)OCC(O)COP1(=O)Oc2ccccc2-c2ccccc21]

and
wherein the nitrogen-based monomer has the formula:

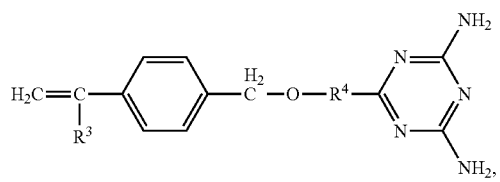

wherein $R^3$ consists of hydrogen, a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, and $R^4$ consists of a phenylene group, a $C_{7-12}$ alkyl phenylene group, a $C_{1-12}$ alkylene group, a $C_{2-12}$ ether group, a $C_{1-12}$ alkylene glycol group, or a $C_{1-12}$ hydroxylalkylene group.

2. The polymer as claimed in claim 1, wherein the nitrogen-based monomer has the formula:

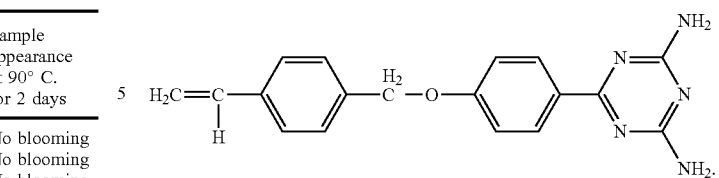

3. The polymer as claimed in claim 1, polymerized of the phosphorous-based monomer and the nitrogen-based monomer, wherein the phosphorous-based monomer and the nitrogen-based monomer have a molar ratio of 1:1 to 10:1.

4. The polymer as claimed in claim 1, having a weight-average molecular weight of about 1,000 to 1,000,000.

5. A flame retardant material, comprising:

a non-halogen flame retarder of a polymer polymerized of a phosphorous-based monomer, a polymer polymerized of a nitrogen-based monomer, a polymer polymerized of the phosphorous-based monomer and the nitrogen-based monomer, or a blend comprising at least two polymers thereof; and a thermoset resin, wherein the phosphorous-based monomer has the formula:

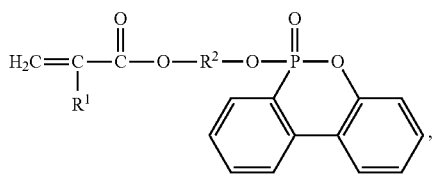

wherein $R^1$ consists of hydrogen, a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, and $R^2$ consists of a phenylene group, a $C_{7-12}$ alkyl phenylene group, a $C_{2-12}$ ether group, a $C_{1-12}$ alkylene glycol group, or a $C_{1-12}$ hydroxylalkylene group, and wherein the nitrogen-based monomer has the formula:

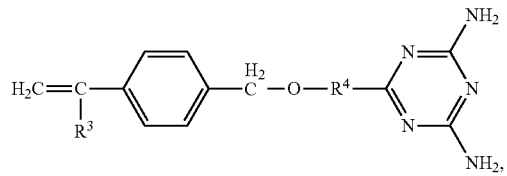

wherein $R^3$ consists of hydrogen, a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, and $R^4$ consists of a phenylene group, a $C_{7-12}$ alkyl phenylene group, a $C_{1-12}$ alkylene group, a $C_{2-12}$ ether group, a $C_{1-12}$ alkylene glycol group, or a $C_{1-12}$ hydroxylalkylene group, and wherein the non-halogen flame retarder and the thermoset resin have a weight ratio of 1:1 to 1:200.

6. The flame retardant material as claim in claim 5, wherein the thermoset resin comprises an epoxy resin.

7. A flame retardant material, comprising:

a non-halogen flame retarder of a polymer polymerized of a phosphorous-based monomer, a polymer polymerized of a nitrogen-based monomer, a polymer polymerized of the phosphorous-based monomer and the nitrogen-based monomer, or a blend comprising at least two polymers thereof; and a thermoplastic resin, wherein the phosphorous-based monomer has the formula:

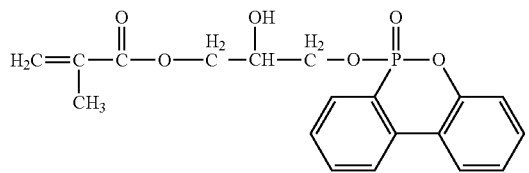 [SMILES: C=C(C)C(=O)OCC(O)COP1(=O)Oc2ccccc2-c2ccccc21]

and wherein the nitrogen-based monomer has the formula:

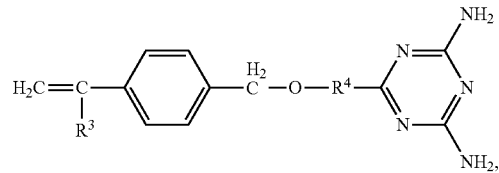

wherein $R^3$ consists of hydrogen, a phenyl group, a $C_{7-12}$ alkyl phenyl group, a $C_{1-12}$ alkyl group, a $C_{2-12}$ ether group, a $C_{1-12}$ alkoxyl group, or a $C_{1-12}$ hydroxylalkyl group, and $R^4$ consists of a phenylene group, a $C_{7-12}$ alkyl phenylene group, a $C_{1-12}$ alkylene group, a $C_{2-12}$ ether group, a $C_{1-12}$ alkylene glycol group, or a $C_{1-12}$ hydroxylalkylene group, and wherein the non-halogen flame retarder and the thermoplastic resin have a weight ratio of 1:1 to 1:200.

8. The flame retardant material as claimed in claim 7, wherein the thermoplastic resin comprises polyamide, polyolefin, or styrene-ethylene-butadiene-styrene copolymer.

* * * * *